Jan. 20, 1959 J. A. BOYAJEAN 2,870,250

PHOTOELECTRIC PICK-UP SYSTEM FOR ENGRAVING MACHINES

Filed Sept. 28, 1953

2,870,250

PHOTOELECTRIC PICK-UP SYSTEM FOR ENGRAVING MACHINES

John A. Boyajean, Huntington, N. Y., assignor to Fairchild Camera and Instrument Corporation, a corporation of Delaware Application September 28, 1953, Serial No. 382,822

2 Claims. (Cl. 178—7.1)

This invention relates to photoelectric pickup systems for engraving machines and, while it is of general application, it is particularly adapted for use in photoelectric engraving machines of the type described and claimed in applicant's prior Patent No. 2,575,546.

In photoelectric engraving machines of the type described in aforesaid Patent No. 2,575,546, a conventional half-tone pattern is formed on an engraving plate by developing a "screen-frequency" signal, that is, a signal of a frequency equal to that of the occurrence of elemental deformations of the engraved plate in the course of the scanning of an image and the engraving plate. This relatively high-frequency signal is then modulated in amplitude in accordance with variations in the shade or tone value of the successive elemental areas of the image being scanned and the modulated screen-frequency signal is applied to an electromagnetic actuating device for the engraving stylus to form the half-tone engraving.

In a machine of the type described, it is convenient to effect modulation of the screen-frequency signal by amplifying it and applying it to excite the light source of the photoelectric pick-up unit, usually a gaseous discharge lamp capable of following the rapid fluctuations of the screen-frequency signal. The signal output of the photoelectric pick-up then varies as the product of the screen-frequency fluctuations and variations in the shade or tone of the successive elemental areas of the image and is thus a true modulated signal.

The present invention constitutes an improvement on the photoelectric pickup system described and is directed specifically to an arrangement for increasing the permissible size of the aperture associated with the photocell of the unit for any given resolution and for minimizing blurring of the reproduced image due to relative motion between the scanning aperture and the image being reproduced. In one form of the present invention a conventional incandescent lamp may be substituted for a gaseous discharge lamp as the light source, thereby substantially reducing the cost of the machine.

It is an object of the present invention, therefore, to provide a new and improved photoelectric pick-up for engraving machines, in which the size of the scanning aperture in the direction of scanning for any given resolution may be substantially increased with respect to apertures of prior photoelectric pick-up systems.

It is another object of the invention to provide a new and improved photoelectric pick-up system for engraving machines, in which blurring of the reproduced image due to relative motion between the scanning aperture and the image being reproduced is minimized.

It is a further object of the invention to provide a new and improved photoelectric pick-up system for engraving machines, in which the foregoing objects can be realized by the use of a simple inexpensive incandescent lamp or other light source of substantially constant intensity.

For a better understanding of the present invention, together with other and further objects thereof, reference is had to the following description taken in connection with the accompanying drawing, while its scope will be pointed out in the appended claims.

In accordance with the invention, there is provided in a photoelectric engraving machine for producing on a plate from an image sheet a screened relief pattern suitable for image reproduction by printing processes, a photoelectric pick-up system for periodically scanning an image to develop an image signal comprising a light source for illuminating successive predetermined elemental areas of an image to be scanned, a photoelectric device exposed to the illuminated elemental areas of the image in succession and having an output circuit for developing an image signal, and electric circuit means coupled to the photoelectric device and effective to limit the developed image signal to a series of sampling pulses of a duration equal to a small fraction of the period required to scan one of the elemental areas, whereby the effect of image motion during scanning is substantially eliminated. The term "coupled to the photoelectric device" is used herein to include either a direct coupling to such device or an indirect coupling from the light source from which the photoelectric device is illuminated, both species of such coupling being specifically illustrated and described herein.

Referring now to the drawing:

Fig. 2 is a chart representing certain operating characteristics of the system of Fig. 1; while

Figure 1:
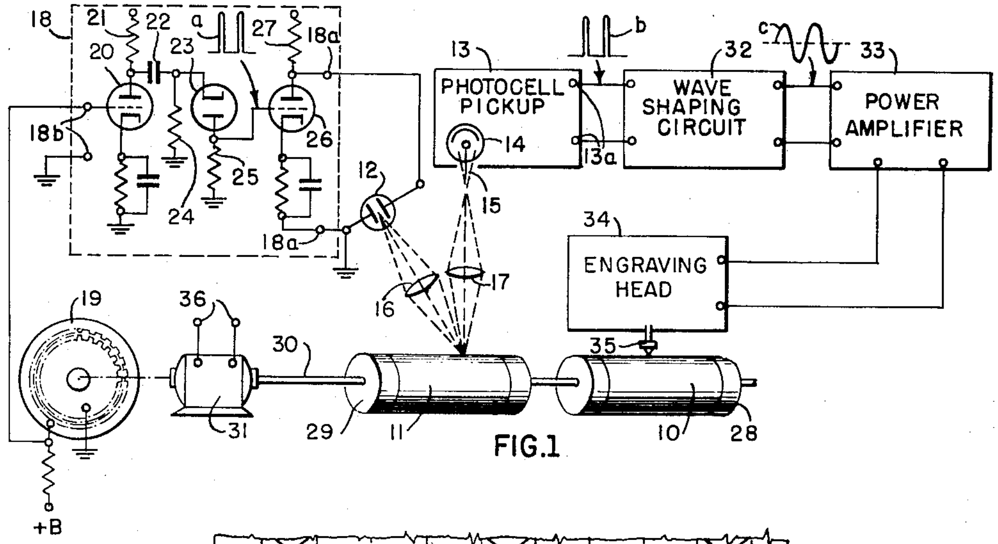
Fig. 1 is a schematic representation of a photoelectric pick-up system for engraving machines embodying the present invention.

Referring now more particularly to Fig. 1 of the drawing, there is represented in schematic form a photoelectric engraving machine for producing on a plate 10 from an image sheet 11 a screened relief pattern suitable for image reproduction by printing processes and including a photoelectric pick-up system embodying the present invention for periodically scanning the image sheet 11 to develop an image signal. The photoelectric pick-up system comprises a gaseous discharge light source 12 for illuminating successive elemental areas of predetermined size during the scanning of the image sheet 11 and a photoelectric device, such as a photocell pick-up unit 13 including a photocell 14, exposed to the illuminated elemental areas of the image sheet 11 in succession during the scanning thereof, the unit 13 having output circuit terminals *13a*, *13a* at which is developed an image signal. The light source 12 may be a Sylvania type R1130B glow lamp or a zirconium arc lamp. The photoelectric pick-up system also includes an optical system for exposing the photocell device 14 to the illuminated elemental areas of the image in succession and having associated therewith an aperture 15 of an effective area approximately equal to an illuminated elemental area. By the term "effective aperture area," as used herein and in the appended claims, is meant the equivalent area of the aperture at the image, giving effect to any magnification of that portion of the optical system between the image sheet and the photocell. The optical system may comprise a condensing lens 16 for focusing the light from the source 12 on to the image sheet 11 in a spot having a predetermined elemental area and a lens 17 for collecting the dispersed light from such illuminated spot and focusing it upon the photocell 14 through the aperture 15.

The photoelectric pick-up system of the invention also includes electric circuit means 18 indirectly coupled to the photoelectric device 14 through the light source 12 and effective to limit the developed image signal at the terminals 13*a*, 13*a* to a series of sampling pulses of a duration equal to a small fraction of the period required to scan one of the predetermined elemental areas of the image sheet 11, that is, the areas removed by the engraving stylus during maximum penetration of the engraved plate. Specifically, the electric circuit means of unit 18 having output terminals 18*a*, 18*a* is connected to excite the light source 12 with pulses of the character described. Electric circuit means 18 includes a signal-input circuit having terminals 18*b*, 18*b* connected to screen-frequency generator 19 driven synchronously with plate 10 and image sheet 11, as described hereinafter. The electric circuit means 18 also includes means for clipping the peaks of the sinusoidal screen-frequency signal. To this end, the signal at the terminals 18*b*, 18*b* is supplied to a vacuum-tube amplifier 20 having a load resistor 21, the signal across which is applied to a peak rectifier circuit comprising a series condenser 22 and a diode rectifier tube 23 having a shunt load resistor 24 and a series load resistor 25 across which the clipped peaks of the amplified input signal are developed. The electric circuit means also includes means for amplifying such clipped peaks to develop periodic pulses synchronous with the sampling pulses, this amplifying means being in the form of a vacuum-tube amplifier 26 to the input electrodes of which is applied the signal across the resistor 25 and having a load resistor 27 across which are developed the sampling pulses or pulses synchronous therewith.

To provide synchronous operation of the system as described, the engraving plate 10 and the image sheet 11 are mounted on cylinders 28 and 29, respectively, which, with the rotor of screen-frequency generator 19, are mounted on a common supporting shaft 30 driven by a motor 31 excited from suitable supply circuit terminals 36, 36, which may be connected to either a direct- or an alternating-current supply.

The photoelectric pick-up system of the invention also includes a wave-shaping circuit 32 for deriving from the image signal pulses developed thereby a substantially sinusoidal image-modulated signal. The wave-shaping circuit 32 is coupled to the terminals 13*a*, 13*a* and has its output circuit connected to a power amplifier unit 33 which, in turn, is connected to excite an engraving head 34 having a stylus 35 acting upon the engraving plate 10. It will be understood that, with the exception of the photoelectric pick-up system described, the other elements of the photoelectric engraving machine may be of conventional form as described in aforesaid Patent No. 2,575,546, so that details of construction may be omitted herein.

In the operation of the photoelectric engraving machine of Fig. 1, the motor 31 drives the cylinders 28 and 29 at a suitable speed as the engraving head 34 and the photoelectric pick-up system including the light source 12 and the pick-up unit 13 are moved transversely in a conventional manner by suitable carriages, not shown. Simultaneously, a sinusoidal alternating potential from the terminals 18*b*, 18*b* is applied to and amplified by amplifier 20 and applied to the peak rectifier comprising the elements 22, 23, 24, and 25. As well understood in the art, in a rectifier of this type, current flows through the rectifier tube 23 and the series resistor 25 only during the peaks of the sinusoidal potential, so that there is developed across resistor 25 and applied to the input electrodes of amplifier 26 a clipped signal having the wave form represented by curve *a* immediately above these elements. This periodic wave has the same frequency as that applied to the input terminals 18*b*, 18*b* but comprises a series of pulses of a duration equal to a small fraction of their period.

Since the gaseous discharge light source 12 is substantially intertialess, the intensity of illumination supplied thereby has the same wave form as that of curve *a* and these short duration light pulses illuminating the image sheet 11 are picked up by the photocell unit 13 and are effective to develop at its output terminals 13*a*, 13*a* a pulse wave as represented by curve *b* immediately thereabove. While only two pulses are shown for the sake of clarity, it will be understood that the amplitude of these pulses is varied or modulated in accordance with the shade or tone values of the successive elemental areas of the image sheet 11 during scanning. The image signal pulses of wave form *b* are then applied to a wave-shaping circuit 32 of any conventional form but usually including a tuned circuit resonant at the frequency of the signal applied to the terminals 18*b*, 18*b*. The circuit 32 is then effective to convert the modulated pulses of wave form *b* into a modulated sinusoidal wave of curve *c*, which is also modulated by the image signal. The signal of wave form *c* is applied to the power amplifier unit 33 and the amplified output thereof is applied to excite the engraving head 34 to actuate the stylus 35 to engrave a half-tone pattern on the engraving plate 10, as described in aforesaid Patent No. 2,575,546.

Figure 2:
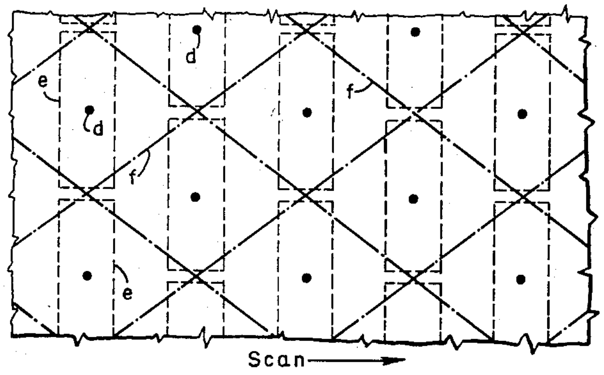

Reference is now made to Fig. 2, which is a chart showing the comparative effective aperture areas of a photoelectric pick-up system of the prior art compared with the system of the invention. In the prior art photoelectric pick-up systems using a sinusoidal signal for exciting the light source 12, the image sheet 11 is illuminated for a major portion of each period of the sinusoidal input signal. With such an arrangement, it has been found desirable to limit the size of the aperture in the direction of scanning so that if the dots *d* in the chart of Fig. 2 represent the centers of successive elemental areas of the image sheet being scanned, the effective aperture areas are represented by the rectangles *e* which, it is seen, have a dimension in the direction of scanning approximately one-half the width of the corresponding dimension of the elemental area. It has been found desirable to utilize an aperture of such reduced areas to improve the resolution or sharpness of the reproduced image and to minimize blurring of the reproduced image due to relative movement between the scanning aperture and the image sheet.

With the use of applicant's improved photoelectric pick-up system, however, it is seen that the light source 12 is illuminated for only a very small fraction of the period required to scan one elemental area of the image. As a result, the relative motion between the scanning aperture and the image sheet is insignificant during this small period of time, so that the effective aperture may be in the form of the parallelograms *f*, consecutive ones of which are contiguous so that, during the scanning process, the apertures actually expose the entire areas of the image sheet 11 rather than only portions thereof, as when using a scanning aperture represented by the rectangles *e*. This use of the entire elemental areas both increases the sensitivity of the photoelectric pick-up, due to the reception of light from an entire elemental area during each instant of illumination, and also develops a signal more representative of the integrated light value of such area.

Figure 3:
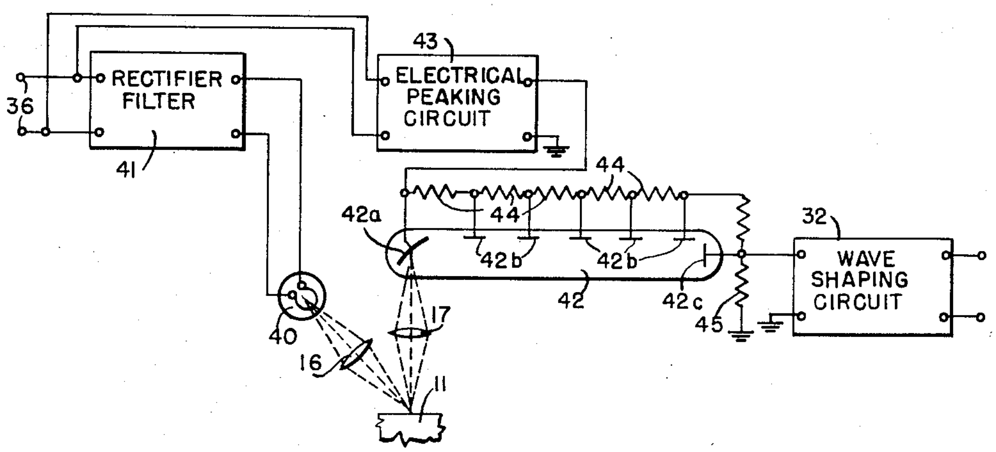
Fig. 3 is a schematic representation of a modified form of the present invention embodying as a light source an incandescent lamp of constant intensity.

In Fig. 3 is represented a modified form of the invention, in which the gaseous discharge light source 12 of Fig. 1 is replaced by a substantially constant intensity light source such as an incandescent lamp 40 which may be excited from a constant-voltage direct-current source, for example, from the supply circuit terminals 36, 36 through a suitable rectifier and filter unit 41. In this arrangement, the photoelectric pick-up device is in the form of a photomultiplier tube 42 having a light-responsive electrode or cathode 42*a*, a series of multiplier electrodes or dynodes 42*b*, and a collector electrode or anode 42*c*. The tube 42 may be of a conventional type RCA 931A presently commercially available. The photoelectric pick-up system of Fig. 3 includes an electric circuit means, such as an electrical peaking circuit 43, coupled directly to the photoelectric device 42 for developing from the sinusoidal signal at the input terminals 19, 19 and applying to the electrode 42*a* a series of sampling pulses of a duration equal to a small fraction of the period required to scan one of the elemental areas of the image sheet 11. The electrical peaking circuit 43 may be similar to the unit 18 of Fig. 1 or it may comprise other well-known means for converting a sinusoidal signal to a sharp pulse signal, for example, a self-saturating transformer, that is, having a constricted core section saturating at low amplitude of exciting current.

The photomultiplier tube 42 is also provided with a voltage divider comprising a series of resistors 44 for applying to the multiplier electrodes **42*b* suitable portions of the potential supplied by the unit 43. The tube 42 is also provided with a load resistor 45** across which is developed the image-modulated pulse signal similar to the wave *b* of Fig. 1 and this signal is applied to the wave-shaping circuit 32 for use in actuating the engraving head of the image as in the system of Fig. 1.

The operation of the system of Fig. 3 is similar to that of Fig. 1, except that in this instance the sampling pulses are developed by effectively causing the photomultiplier tube 42 to sample the illuminated elemental areas of the image sheet 11 during scanning, these areas being subject to constant intensity illumination from the light source 40. The signal output of the photomultiplier tube 42 is, as stated, substantially the same as that of the photocell pick-up unit 13 of Fig. 1 and may be similarly utilized for the engraving operation.

While there have been described what are at present considered to be the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a photoelectric engraving machine for producing on a plate from an image sheet a screened relief pattern suitable for image reproduction by printing processes, a photoelectric pick-up system for periodically scanning an image to develop an image signal comprising: a light source for illuminating successive predetermined elemental areas of an image to be scanned; a photoelectric device exposed to the illuminated elemental areas of said image in succession and having an output circuit for developing an image signal; and electric circuit means coupled to said photoelectric device and effective to limit the developed image signal to a series of sampling pulses of a duration equal to a small fraction of the period required to scan one of said elemental areas, said electric circuit means including a sinusoidal signal input circuit, means for clipping the peaks of an input signal, means for amplifying said clipped peaks to develop periodic pulses synchronous with said sampling pulses, whereby the effect of image motion during scanning is substantially eliminated.

2. In a photoelectric engraving machine for producing on a plate from an image sheet a screened relief pattern suitable for image reproduction by printing processes, a photoelectric pick-up system for periodically scanning an image to develop an image signal comprising: a light source for illuminating successive predetermined elemental areas of an image to be scanned; a photoelectric device exposed to the illuminated elemental areas of said image in succession and having an output circuit for developing an image signal; electric circuit means coupled to said photoelectric device and effective to limit the developed image signal to a series of sampling pulses of a duration equal to a small fraction of the period required to scan one of said elemental areas, whereby the effect of image motion during scanning is substantially eliminated; and a wave-shaping circuit coupled to said output circuit of said device for deriving from said image-signal pulses a substantially sinusoidal image-modulated signal.

References Cited in the file of this patent

UNITED STATES PATENTS

| | | |
|---|---|---|
| 2,357,938 | Dench | Sept. 12, 1944 |
| 2,496,102 | McCord | Jan. 31, 1950 |
| 2,499,181 | Downes et al. | Feb. 28, 1950 |
| 2,575,546 | Boyajean | Nov. 20, 1951 |
| 2,651,674 | Theile | Sept. 8, 1953 |
| 2,804,497 | Eliot | Aug. 27, 1957 |